United States Patent [19]

Rohlin

[11] 4,358,230

[45] Nov. 9, 1982

[54] CHUCK OPERATING DEVICE FOR HAND DRILL

[76] Inventor: Robert W. Rohlin, 52 Skycrest Dr., Rochester, N.Y. 14616

[21] Appl. No.: 137,531

[22] Filed: Apr. 4, 1980

[51] Int. Cl.³ .............................................. B23B 31/06
[52] U.S. Cl. ...................................... 408/124; 408/4; 408/710; 279/1 K; 279/62
[58] Field of Search .................. 408/241 R, 124, 240, 408/4, 710; 279/56, 69, 1 K, 1 H, 62

[56] References Cited

U.S. PATENT DOCUMENTS

| 2,716,555 | 8/1955 | Rowe | 279/69 X |
| 2,876,369 | 3/1959 | Doerner | 408/4 X |
| 4,085,337 | 4/1978 | Moeller | 408/124 |
| 4,260,169 | 4/1981 | Hall | 279/64 X |
| 4,317,578 | 3/1982 | Welch | 279/60 |
| 4,323,324 | 4/1982 | Eberhardt | 279/1 K |

*Primary Examiner*—Leonidas Vlachos
*Attorney, Agent, or Firm*—Shlesinger, Fitzsimmons & Shlesinger

[57] ABSTRACT

The drill includes the usual tool spindle driven by reversible motor, and conventional chucking jaws which rotate with the spindle. The jaws are surrounded by an actuator which is drivingly connected to the jaws, and normally rotates with the jaws when the drill is in use. A manually operable control member on the housing is movable between two operating positions in each of which it holds the actuator against rotation, and consequently causes the spindle to move the jaws to bit-locking or bit-releasing positions, depending upon the direction or rotation of the spindle. Whenever the control member is moved from one to the other of its positions it switches the direction of rotation of the motor. A projection on the control member is releasably engagable selectively in a matching recess in the actuator to impart static loading to the jaws during movement thereof to their bit-locking positions, or in a larger recess in the actuator to impart dynamic loading to the chucking jaws during movement thereof to bit-releasing positions. Safety means is provided for preventing accidental movement of the control member from one to the other of its positions during use of the drill.

13 Claims, 6 Drawing Figures

CHUCK OPERATING DEVICE FOR HAND DRILL

This invention relates to electrically operated hand drills, and more particularly to a novel device for utilizing the motor of a hand drill for operating its chucking jaws.

With current manufacturing techniques it has been possible to mass produce small electrical hand drills. Typically these drills include two-speed fractional horsepower electrical motors that are designed to be operated on 115 volt household circuits, and the like. Drills of this type are usually designed to have the associated drill bit secured in the unit by a manually-operated chuck. The jaws of such chuck are reciprocated by a small hand wrench which has a head shaped like a bevel gear, and which engages simultaneously in a radial hole in the drill spindle and in the teeth of a jaw-operating gear which is rotatable on the spindle.

An obvious disadvantage of this type of construction is that the specially-shaped hand wrench is frequently mislaid or lost, thus rendering the drill, in essence, useless until the wrench has been replaced. Still another disadvantage of this type of mechanism is that whether or not the drill bit is securely locked in the chuck depends to a great extent upon the strength of the operator.

In order to obviate the above-noted disadvantages efforts have been made to provide a mechanism which utilizes the power of the electric motor of the hand drill for operating its chucking jaws. One such mechanism is disclosed in the Rowe U.S. Pat. No. 2,716,555, wherein a chuck-operating sleeve, which normally rotates with the drill spindle, can be prevented from rotating with the spindle by pushing a manually-operated chucking button radially inwardly of the drill housing to engage a lug which projects from the chuck-operating sleeve. Engagement of the chucking button with the lug prevents the sleeve from rotating with the drill spindle. As a consequence the chucking sleeve is shifted axially of the spindle either forwardly or in a reverse direction, respectively to release or to secure a bit in the associated chucking jaws.

The disadvantage of this construction, however, is that the operator can never be sure of the relative positions as between the chucking button, when it is pushed, and the lug on the operating sleeve, which is to be engaged by the button. In other words, it is possible that the lug will be in the way of the button and will prevent its operation, or alternatively, the lug may be out of alignment with the button at the time the latter is operated and will be rotated suddenly or with impact into engagement with the button as soon as the drill motor is started. Therefore, there can be no assurance as to whether or not there will or will not be any impact loading as between the chucking button and the lug on the chuck-operating sleeve.

It is an object of this invention, therefore, to provide an improved chuck operating device of the type described which eliminates any guessing, and assures that whenever a chuck operating mechanism for drills of the type described is operated, the force with which the chucking jaws are opened and closed can be predicted with certainty.

Another object of this invention is to provide an improved chucking device of the type described which is specifically designed to provide impact loading of the chucking jaws during the release thereof, and to provide static loading of the jaws during the movement thereof to their bit-engaging positions.

Still another object of this invention is to provide an improved chuck operating device of the type described which incorporates safety devices which prevent any accidental operation of the chuck operating mechanism during normal operation of the drill.

Other objects of this invention will be apparent hereinafter from the specification and from the recital of the appended claims, particularly when read in conjunction with the accompanying drawing.

Figure 1:
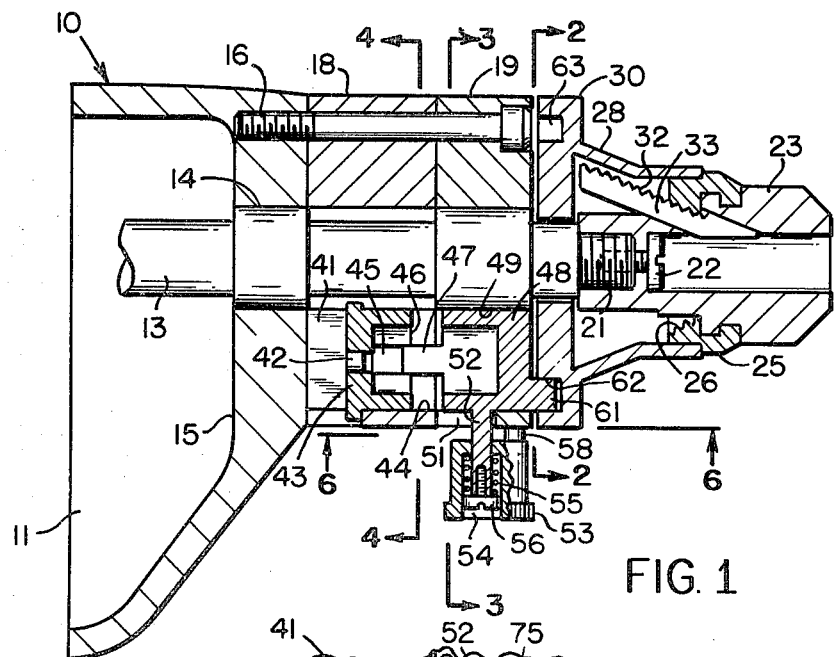
FIG. 1 is a fragmentary longitudinal sectional view taken through the forward end of an electric hand drill having a novel chucking device made according to one embodiment of this invention.

Referring now to the drawing by numerals of reference, 10 denotes generally the housing of an electric hand drill having a chamber 11 containing an electric motor (not illustrated), the armature of which is drivingly connected to a shaft or spindle 13, which is journaled intermediate its ends in a bearing 14 that is secured in an opening in the front wall of 15 of housing 10. Secured by a plurality of bolts 16 against a plane surface formed on the exterior of wall 15 are two annular members 18 and 19, which have identical internal and external diameters, respectfully.

Shaft 13 extends axially through the bores in members 18 and 19, and is journaled in member 19 in a bearing which is similar to the bearing 14 in the housing wall 15. Threaded at its inner end onto an externally threaded shank 21 that is formed on the outer end of the shaft 13, and secured by a screw 22 against rotation relative to the shaft, is a tubular tool bit holder 23. Rotatably mounted in a conventional manner on the bit holder 23 is a jaw actuating ring 25, which has an internally threaded bore 26 that is truncated-conical in configuration for a purpose noted hereinafter. The inner or left hand end of the ring 25, as shown in FIG. 1 is secured in the bore of an annular skirt or ring flange 28, which projects coaxially from one side of an annular operating disk 30, which surrounds the shaft 13 in confronting coaxial relation to the outer end of the annular member 19. The internally threaded bore 26 of the actuating ring 25 is drivingly engaged with the threaded outer edges 32 of each of a plurality of conventional chuck jaws 33, which are mounted in a conventional manner to reciprocate diagonally beneath flange 28, and into and out of bit engaging or bit gripping positions as noted in greater detail hereinafter.

The direction of rotation of the motor which drives shaft 13 is controlled by a switch that is contained in a housing 41, which is secured against the outside of the housing wall 15 adjacent its lower edge, and which projects into a recess formed in the confronting side of member 18. The switch in housing 41 has an operating shaft 42, which projects into a central opening formed in one end of a cylindrical coupling member 43, which is mounted to rotate in a circular opening 44 that is formed in member 18 beneath and parallel to its axial bore. Shaft 42 has thereon a chordal flat 42' (FIG. 4) which engages a corresponding flat in the bore of member 43, so that any rotation of the latter will be imparted to the shaft 42.

The counterbored end of member 43 remote from the housing 41 has therein opposed, diametral slots 45, which separate this annular section of member 43 into two, opposed, arcuate lugs 46. Projecting slidably into spaces 45 between the lugs 46 are two coupling projections 47, which extend from one end of a cylindrical control member 48, that is mounted for limited rotational and axial movement in a circular opening 49 formed in member 19 beneath and parallel to its axial bore.

Projecting radially from member 48 through an arcuate slot 51, which is formed in member 19 to communicate with the opening 49, is a rigid stem 52, which carries a movable, spring-loaded operating knob 53. Stem 52 extends into a bore 54 in the knob 53 and is surrounded by a spring 55, which is seated at one end against the bottom of the bore 54, and at its opposite end against the head of a screw 56 which is threaded in the upper end of the stem, whereby spring 55 urges the knob 53 resiliently and radially inwardly on the stem towards the axis of member 48. On its inner end knob 53 has at one side of the stem 52 an axial projection or lug 58, which is engagable selectively either with the outer surface of member 19 (FIg. 1) or with the outer peripheral surface of control member 48, as described in greater detail hereinafter.

Figures 2, 3, 6:
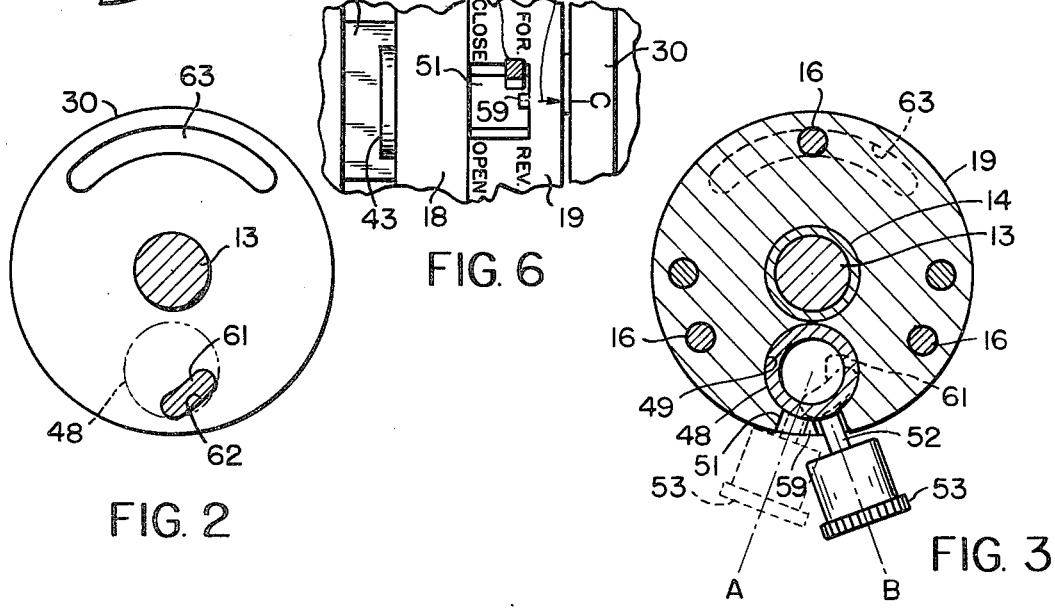
FIG. 2 is a sectional view taken along the line 2—2 in FIG. 1 and looking in the direction of the arrows, and showing the chucking device in a bit locking position.
FIG. 3 is a sectional view taken along the line 3—3 in FIG. 1 looking in the direction of the arrows.
FIG. 6 is a fragmentary sectional view taken generally along the line 6—6 in FIG. 1 looking in the direction of the arrows.

Remote from its coupling section 47 the control member 48 has thereon an arcuate operating lug 61, which in the position as shown in the drawing, is releasably seated in a similarly shaped recess 62, which is formed in the confronting face of the actuating member 30. As shown more clearly in FIGS. 2 and 5, the arcuate recess 62 in member 30 has a centerline the axis of which does not coincide with the axis of member 30 and shaft 13. As a consequence there is only one angular position of member 30 relative to member 48, which will enable lug 61 to be inserted into recess 62; and this is the position of member 30 as illustrated in FIGS. 1, 2 and 6. When members 48 and 30 are in these engaged positions, stem 52 will be in the angular position denoted by line B in FIG. 3, in which case the stem 52 will be positioned between one end of slot 51 (the upper end as shown in FIG. 6), and a stop lug or dog 59 which projects into the middle of slot 51 from its forward edge (see FIG. 6). At this time the switch in housing 41 will have been rotated by member 43 into a position in which it causes the associated motor to be driven in a forward direction, when the operating switch (not illustrated) is squeezed or closed in the usual manner during drill operation. As noted hereinafter, this is the chuck-closing position of the device; and this fact is indicated by the registry of a mark "C", which is inscribed on the periphery of member 30 (FIG. 6), with an index arrow 75, which is inscribed on the periphery of member 19.

At this time a bit may be inserted into the bore of holder 23, after which the operator momentarily squeezes or closes the motor operating switch. Assuming that this causes the motor momentarily to rotate shaft 13 in a clockwise direction as shown in FIG. 2 the holder 23 and its jaws 33 also will tend to rotate clockwise. However, since at this time lug 61 locks member 30 and the actuating ring 25 against rotation, the threaded connection between ring 25 and jaws 33 cause the latter to be shifted axially forwardly and radially inwardly into chucking or locking engagement with the peripheral surface of the tool bit.

After the bit has been chucked in holder 23 by momentary energization of the drill motor, the control member 48 is manipulated by its knob or handle 53 rearwardly from its advanced or jaw-actuating position to a retracted or inoperative position (not illustrated) in which member 48 is shifted axially part way into the opening 44 in member 18, and far enough to cause its lug 61 completely to be withdrawn or disengaged from the actuating member 30. In this inoperative position the stem 52 of member 48 will be engaged against the left end of the slot 51 as shown in FIG. 1, and the spring-loaded knob 53 will have been advanced radially inwardly far enough to cause its lug 58 to drop downwardly through slot 51 toward the outer periphery of member 48, and between the stop lug 59 and the upper end of slot 51 as this slot is illustrated in FIG. 6. At this time the control member 48 cannot be accidentally advanced axially to the right in FIG. 1 towards its operative position, nor can it be rotated accidentally from one to the other of its limit positions in slot 51 until such time as the knob 53 is once again drawn radially outwardly against the resistance of spring 55, and far enough to disengage the lug 58 from within the slot 51 as noted hereinafter. With the bit now secured in the chuck jaws 33, and the lug 61 disengaged from member 30, the drill may now be used in a conventional manner for drilling purposes.

Figures 4, 5:
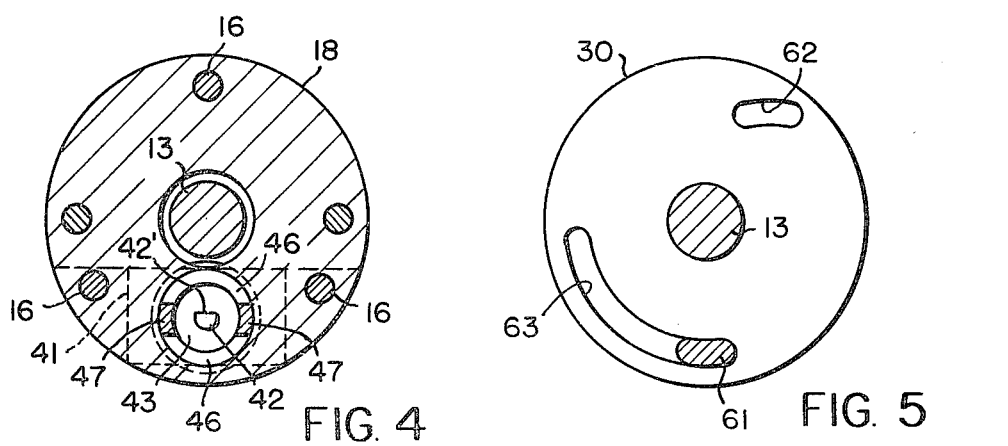
FIG. 4 is a sectional view taken along the line 4—4 in FIG. 1 looking in the direction of the arrows.
FIG. 5 is a view similar to FIG. 2 but showing the chucking device in a bit releasing position.

When it is desired to remove a bit from the drill, the motor is stopped, and handle 53 on the now-retracted member 48 is pulled upwardly against spring 55 to withdraw lug 58 from between stop lug 59 and the upper end of slot 51 as shown in FIG. 6. The handle and retracted member 48 are then rotated into motor-reversing and chuck-opening position as denoted by line A in FIG. 3, thus swinging stem 52 against the opposite or lower end of slot 51 as shown in FIG. 6. This causes the switch in housing 41 to change the motor rotation to reverse, or for counter-clockwise rotation of shaft 13 as shown in FIGS. 2 and 5, and also rotates the lug 61 into its other limit position as shown in FIG. 5.

Also at this time member 30 is rotated manually until a second indicator mark on its periphery (not illustrated) registers with the index arrow 75 on member 19. When member 30 is in this latter position, a second recess 63 in its inner face will have been rotated into the position shown in FIG. 5. This places one end of recess 63, which is disposed coaxially of shaft 13, in coaxial registry with the arcuate lug 61 on member 48, thereby permitting the control member 48 to be advanced axially forwardly, and thus causing its projection 61 to be inserted into the right end of recess 63 as shown in FIG. 5. This operatively couples the control member 48 once again to the actuating member 30. Now, with the associated drill motor connected for rotation in a reverse direction, when the operator next closes the motor energizing switch the shaft 13 is caused suddenly to rotate in a counter-clockwise direction, thereby rotating with it the holder 23 and the locked jaws 33. During this initial movement the frictional engagement between the threads on the actuating ring 25 and the threads 32 on the jaws 33 causes the actuating member 30 also to be rotated counter-clockwise, and suddenly, from the position shown in FIG. 5 until the left end of the recess 63 is swing into engagement with the stationary lug 61 on the control member 48. This sudden impact loading of the left end of the recess 63 against the stationary lug 61 causes the jaw actuating ring 25 suddenly to be rotated in a jaw unlocking direction relative to the jaws 33, so that the jaws are disengaged from the bit then in the bore of the holder 23. As soon as the bit is released the operator releases the motor energizing switch once again to deenergize the motor until such time that the control member 48 is thereafter disengaged from the actuating member 30.

The reason that the elongate, arcuate recess 63 is employed in the member 30 is because once the jaws 33 have become engaged with a tool bit, it has been discovered that it requires a sudden application of load to actuating ring 25 in order to cause it to disengage the jaws from the bit. The static loading which is imparted to the jaws during the closing thereof by operation of the lug 61 in the small recess 62 is not sufficient to unlock the jaws, although such loading is sufficient to effect satisfactory locking of the jaws against the bit.

From the foregoing it will be apparent that the present invention provides a relatively simple and inexpensive means for utilizing the electric motor of a conventional hand drill for selectively locking a tool bit in the drill, or for releasing the bit after it has been used. By utilizing a specially shaped control lug 61 and cooperating recesses 62 and 63, it is possible to apply substantially static loading to the chucking jaws 33 during the locking of a bit in the drill, while during the unlocking of the bit an impact load is applied through the ring 25 to the jaws to enable release thereof. Moreover, by utilizing the spring-loaded operating knob 53 together with a safety detent or lug 58 thereon accidental or undesirable movement of the control member 48 both angularly and axially in slot 51 is prevented during operation of the drill.

Still another advantage of this invention is that the recesses 62 and 63 in the actuating member are so designated that it is impossible to insert the lug 61 into either recess 62 or 63 unless the actuating member is already in a predetermined angular position relative to lug 61. Moreover, when the operating knob 53 is in its jaw-locking or closing position B as shown in FIGS. 2, 3 and 6, it is virtually impossible to insert the operating lug 61 into the recess 63, regardless of the angular position of actuating member 30 about its axis. Likewise, whenever the control member 48 is in its jaw-releasing position A, the center of the arcuate path defined by lug 61 will be registerable with the center of the arculate path as defined by the recess 63 in member 30, but it will be impossible at this time for the lug 61 to enter the recess 62, the centerline of which is not coincident with the centerline of recess 63.

While this invention has been described in detail in connection with only one embodiment thereof, it will be apparent that it is capable of still further modification, and that this application is intended to cover any such modifications as may fall within the scope of one skilled in the art, or the appended claims.

What I claim is:

1. In an electric hand drill of the type having in its housing a reversible electric motor, a tool spindle rotatable selectively in opposite directions by said motor, and a plurality of chucking jaws surrounding one end of said spindle selectively for rotation therewith, and for movement relative to said spindle for releasably securing a tool bit in a bore in said one end of the spindle, a device for selectively connecting said jaws to said motor for movement thereby between bit-locking and bit-releasing positions, respectively, comprising a chuck actuator member rotatably mounted on said spindle and drivingly connected to said jaws normally to rotate with said jaws and said spindle relative to said housing, and manually operable control means on said housing for selectively securing said actuator member against rotation with said spindle, whereby rotation of said spindle relative to said actuator member causes said jaws to be moved to bit-locking positions, when said spindle is rotated in one direction, and to bit-releasing positions, when said spindle is rotated in the opposite direction, said control means being operative to effect a static loading of said jaws by said spindle when the spindle is rotated by said motor in said one direction, and to effect a dynamic loading of said jaws by said spindle, when the latter is rotated by said motor in said opposite direction.

2. A hand drill as defined in claim 1, wherein said control means comprises a control member on said housing movable manually between a first limit position in which it is engageable with said actuator member to hold the latter against rotation with said spindle in said one direction, and a second limit position in which it is engageable with said actuator member to hold it against rotation with said spindle in said opposite direction, and a means is connected to said control member and is operative automatically to reverse the direction of rotation of said motor, and hence said spindle, each time said control member is moved from one to the other of its limit positions.

3. A hand drill as defined in claim 2, including means for releasably coupling said control member to said actuator member when said control member is in either of its two limit positions, thereby operatively and releasably to connect said members with each other, and safety means for permitting operation of said coupling means and consequent connection of said members only when said actuator member is in a predetermined angular position on said spindle relative to said control member.

4. A hand drill as defined in claim 3, wherein said members have confronting surfaces thereon, said coupling means comprises a projection on one of said confronting surfaces releasably engageable selectively in one of two, spaced recesses formed in the other of said surfaces to effect connection of said members, and one of said members is mounted for limited reciprocable movement toward and away from the other member thereby respectively to engage said projection in, and to disengage it from, one of said recesses, when said control member is in one of its limit positions.

5. A hand drill as defined in claim 4, wherein one of said recesses is similar in size to said projection, and the other of said recesses is larger than said projection, whereby when said projection is engaged in said one recess said actuator member is fixed against rotation with said spindle, and when said projection is engaged in said other recess said actuator member is capable of rotating with said spindle for only a portion of a revolution of the spindle.

6. A hand drill as defined in claim 4, wherein said projection and recesses are so configured that said projection cannot be inserted into one of said recesses unless said members are positioned in predetermined positions relative to each other.

7. A hand drill as defined in claim 2, wherein
said control member is mounted on said housing for limited movement back and forth between its first and second limit positions, and has thereon a coupling projection confronting said actuator member,
said actuator member has therein a pair of spaced coupling recesses selectively registrable with and engageable by said projections, and
one of said members is mounted for limited movement toward and away from the other, and selectively to cause said projection to be engaged in, and to be disengaged from, one of said recesses, when said control member is in one of its limit positions.

8. A hand drill as defined in claim 7, including
first safety means resisting movement of said control member between its two limit positions, when said projection is disengaged from said coupling recesses, and
second safety means resisting movement of said one member toward the other, when said projection is disengaged from said coupling recesses.

9. A hand drill as defined in claim 7, including means mounting said members on said housing in such manner that, when said control member is in one of its two limit positions, said projection can be engaged only in a predetermined one of said two recesses, and when said control member in its other limit position, said projection can only be engaged in the other of said two recesses.

10. A hand drill as defined in claim 7, wherein one of said recesses conforms in size to said projection, and the other recess is substantially larger than said one recess, whereby said spindle imparts static loading to said jaws, when said projection is engaged in said one recess, and is capable of imparting said dynamic loading of said jaws, when said projection is engaged in said other recess.

11. A hand drill comprising
a housing containing a rotatable tool spindle, a reversible electric motor for driving the spindle, and a movable chucking mechanism on said spindle operable releasably to lock a tool bit in the spindle,
coupling means for releasably connecting said chucking mechanism to said housing, including a control member movable selectively to first and second positions, respectively, to effect movement of said mechanism toward a bit locking position, when said motor drives said spindle in one direction, and toward a bit releasing position, when said motor drives said spindle in the opposite direction,
means connected to said control member for operation thereby and operative automatically to cause said motor, when energized, to rotate said spindle in said one direction, when said control member is in said first position, and to rotate said spindle in said opposite direction, when said control member is in said second position,
a handle on said control member for manipulating said member manually between said first and second positions, and
safety means interposed between said handle and said control member and operative to resist movement of said member to either of its first and second positions thereby to prevent accidental connection of said motor to said chucking mechanism during normal use of the drill.

12. A hand comprising
a housing containing a rotatable tool spindle, a reversible electric motor for driving the spindle, and a movable chucking mechanism on said spindle operable releasably to lock a tool bit in the spindle,
coupling means for releasably connecting said chucking mechanism to said housing, including a control member movable selectively to first and second positions, respectively, to effect movement of said mechanism toward a bit locking position, when said motor drives said spindle in one direction, and toward a bit releasing position, when said motor drives said spindle in the opposite direction, means connected to said control member for operation thereby and operative automatically to cause said motor, when energized, to rotate said spindle in said one direction, when said control member is in said first position, and to rotate said spindle in said opposite direction, when said control member is in said second position,
said coupling means including means for imparting a static load to said mechanism to effect movement thereof to its bit locking position, and for imparting a dynamic load to said mechanism to effect movement thereof to its bit releasing position.

13. A hand drill as defined in claim 11, wherein
said mechanism is mounted for rotation with said spindle, and for movement relative to said spindle during movement of the mechanism between its bit locking and bit releasing positions, respectively,
an actuator member is drivingly connected to said mechanism normally to rotate therewith,
said control member is engageable in either of its first or second positions with said actuator member to prevent rotation thereof with said chucking mechanism, and
said actuator member is operative, when held against rotation by said control member, to cause the rotating mechanism to be moved to either its bit locking or bit releasing position, depending upon the direction of rotation of said spindle.

* * * * *